(12) United States Patent
Reisman

(10) Patent No.: US 7,062,488 B1
(45) Date of Patent: Jun. 13, 2006

(54) TASK/DOMAIN SEGMENTATION IN APPLYING FEEDBACK TO COMMAND CONTROL

(76) Inventor: Richard Reisman, 20 E. 9th St., New York, NY (US) 10003

( * ) Notice: Subject to any disclaimer, the term of this patent is extended or adjusted under 35 U.S.C. 154(b) by 366 days.

(21) Appl. No.: 09/651,243

(22) Filed: Aug. 30, 2000

(51) Int. Cl.
*G06F 17/30* (2006.01)

(52) U.S. Cl. .................. 707/8; 707/203; 707/104.1
(58) Field of Classification Search ............. 707/1–10, 707/100–104.1, 200–205
See application file for complete search history.

(56) References Cited

U.S. PATENT DOCUMENTS

| | | | |
|---|---|---|---|
| 4,974,191 A | 11/1990 | Amirghodsi et al. | 709/8 |
| 5,224,205 A | 6/1993 | Dinkin et al. | 709/226 |
| 5,511,208 A | 4/1996 | Boyles et al. | 709/223 |
| 5,659,731 A | 8/1997 | Gustafson | 395/604 |
| 5,748,945 A | 5/1998 | Ng | 703/23 |
| 5,751,956 A | 5/1998 | Kirsch | 709/203 |
| 5,764,906 A | 6/1998 | Edelstein et al. | 709/219 |
| 5,794,050 A | 8/1998 | Dahlgren et al. | 717/144 |
| 5,835,897 A | 11/1998 | Dang | 705/1 |
| 5,855,020 A | 12/1998 | Kirsch | 707/10 |
| 5,929,852 A | 7/1999 | Fisher et al. | 345/739 |
| 5,974,444 A | 10/1999 | Konrad | 709/203 |
| 5,978,847 A | 11/1999 | Kisor et al. | 709/227 |
| 6,006,222 A | 12/1999 | Culliss | 707/5 |
| 6,014,665 A | 1/2000 | Culliss | 707/5 |
| 6,029,192 A | 2/2000 | Hill et al. | 709/206 |
| 6,041,311 A | 3/2000 | Chislenko et al. | 705/27 |
| 6,067,539 A | 5/2000 | Cohen | 707/2 |
| 6,092,100 A | 7/2000 | Berstis et al. | 709/203 |
| 6,112,242 A | 8/2000 | Jois et al. | 709/225 |
| 6,138,155 A | 10/2000 | Davis et al. | 709/224 |
| 6,151,624 A | 11/2000 | Teare et al. | 709/217 |
| 6,192,364 B1 | 2/2001 | Baclawski | 707/10 |
| 6,269,361 B1 * | 7/2001 | Davis et al. | 707/3 |
| 6,271,840 B1 | 8/2001 | Finseth et al. | 345/349 |
| 6,366,956 B1 | 4/2002 | Krishnan | 709/223 |
| 6,460,036 B1 * | 10/2002 | Herz | 707/10 |

(Continued)

FOREIGN PATENT DOCUMENTS

WO    WO 99/19816    4/1999

(Continued)

OTHER PUBLICATIONS

"How does inference find work?" available at http://www.infind.com/about.html as of Nov. 11, 1999.

(Continued)

*Primary Examiner*—Mohammad Ali
(74) *Attorney, Agent, or Firm*—Min, Hsieh & Hack, LLP

(57) ABSTRACT

An apparatus for responding to a current user command associated with one of a plurality of task/domains. The apparatus comprises: a digital storage device that stores cumulative feedback data gathered from multiple users during previous operations of the apparatus and segregated in accordance with the plurality of task/domains; a first digital logic device that determines the current task/domain with which the current user command is associated; a second digital logic device that determines a current response to the current user command on the basis of that portion of the stored cumulative feedback data associated with the current task/domain; a first communication interface that communicates to the user the current response; and a second communication interface that receives from the user current feedback data regarding the current response. The current feedback data is added to the cumulative feedback data stored in the digital storage device and associated with the current task/domain.

40 Claims, 6 Drawing Sheets

U.S. PATENT DOCUMENTS 6,480,837 B1 11/2002 Dutta .............................. 707/3
6,546,388 B1 4/2003 Edlund et al. .................. 707/5
6,615,237 B1 9/2003 Kyne et al. ................... 709/203

FOREIGN PATENT DOCUMENTS

WO WO 99/39275 8/1999
WO WO 99/39280 8/1999

OTHER PUBLICATIONS

Kathleen Hall, "Ask Jeeves Takes Direct Hit", available http://www.gigaweb.com/Content/GIB/RIB-022000-00177.html, as of Feb. 19, 2000.
"Latest engines go vertical in search of relevant information", Harvard Computing Group Report, available at http://www.bettergetter.com/betterg/demo/whitepaper.jsp as of Dec. 20, 1999.
"About the W3-CorporaProject" available at http://www.essex.ac.UK/W3c/corpus_ling/about.html as of Aug. 24, 2000.
"Language Translation" available at http://www-dse.doc.ic.ac.UK/~nd/surprise_97/journal/vol4/hks/trans.html as of Aug. 23, 2000.
"Conclusion" available at http://www-dse.doc.ic.ac.UK/~nd/surprise_97/journal/vol4/hks/conclu.html as of Aug. 23, 2000.
"Language Software," available at http://www-dse.doc.ic.ac.UK/~nd/surprise_97/journal/vol2/hks/lan_trans.html as of Aug. 23, 2000.
"Symmetry Health Data Systems Achieves Patent ETG and 'Dynamic Time Window' new industry standards." available at http://www.Symmetry-health.com/PR_Patent.html as of Jun. 21, 2000.
"Resource For The Semantic Web", available at http://www.semanticweb.org/resources.html as of May 27, 2000.
Web Design Issues "What a Semantic Can Represent" available at http://www.w3.org/DesignIssues/RDFnot.html as of Dec. 8, 2000.
Bob Metcalfe, "Web Father Berners-Lee Shares Next-Generation Vision of the Semantic Web." InfoWorld vol. 21, Issue 21, May 24, 1999.
Tim Berners-Lee "The Meaning of a Document-Axioms of Web Architecture," available at http://www.w3.org/DesignIssues/Meaning.html, Dated 1999, last modified Jan. 24, 2000.
Alexander Chislenko, "Semantic Web Vision Paper" Version 0.28, Jun. 29, 1997, available at http://www.lucifer.com/~sasha/Articles/SemanticWeb.html.
Tim Berners-Lee, "Semantic Web Road Map", Sep. 1998, last modified Oct. 14, 1998, available at http://www.W3.org/DesignIssues/Semantic.html.
Tim Berners-Lee, "Semantic Web as a Language of Logic", 1998, last modified Apr. 14, 2000, available at http://www.W3.org/DesignIssues/Logic.html.
"Semantic Search—The SHOE Search Engine", available at http://www.cs.umd.edu/projects/plus/SHOE/search/, as of May 29, 2000.
"Telcordia™ Latest Semantic Indexing Software (LSI): Beyond Keyword Retrieval," available at http://lsi.research.telcordia.com/lsi/papers/execsum.html as of Dec. 11, 2000.
Jeff Heflin et al., "Searching the Web with SHOE", Dept. of Computer Science, University of Maryland.
"The SHOE FAQ", available at http://www.cs.umd.edu/projects/plus/SHOE/faq.html as of May 29, 2000.
Dagobert Soergel, Review of WordNet, D-Lib Magazine, Oct. 1998, available at http://www.dlib.org/dlib/October98/10bookreview.html.
Harold Boley, et al., "Tutorial on Knowledge Markup Techniques", Aug. 22, 2000, available at http://www.semanticweb.org/knowmarktutorial/ as of May 29, 2000.
Paula J. Hane, "Beyond Keyword Searching—Oingo and Simpli.com Introduce Meaning-Based Searching," Dec. 20, 1999, available at http://www.infotoday.com/newsbreaks/nbl1220-2.htm.
Sharon Cleary, "Simpli.com Uses Linguistics to Help Web Engines Do Better Searches", Wall Street Journal Interactive Edition, Feb. 7, 2000.
"Simplified Technology White Paper", available at http://www.simpli.com/search_white_paper.html.
Reed Hellman, "A Semantic Approach Adds Meaning to the Web", Computer, Dec. 1999.
"What is 1 jump", available at http://www.1jump.com/as of Nov. 11, 1999.
"Alexa FAQ's", available at http://www.alexa.com/whatisalexa/faq.html as of Feb. 14, 1998.
"1 jump for Windows features and benefits" available at http://www.1jump.com/featurebenefit.html as of Nov. 11, 1999.
"1 jump company and contact information", available at http://www.1jump.com/corp.html as of Nov. 11, 1999.
"Alexa User Paths", available at http://www.alexa.com/whatisalexa/user_paths.html. as of Feb. 14, 1998.
John F. Ince, "Searching for Profits: The pioneers had to expand to make money. Will the next wave fare any better?" Upside, May 2000 available at http://www.upsidetoday.com.
Jim Rapoza, "Alexa's Theory of Relativity Filtering analytical algorithms link to Web sites—relevant or not", PC Week Labs available at http://www.Zdnet.com/pcweek/reviews/0818/18alex.html as of Feb. 14, 1998.
"1 jump Help menu", available at http://www.alexa.com.
BAA 00-07 Proposer Information Pamphlet: Agent Based Computing, available at http://www.darpa.mil/iso/ABC/BAA0007PIP.htm.
GlobalBrain.net, Home Page, Background and Technology from GlobalBrain.net Web site www.GlobalBrain.net, Jun. 1999.
"Real Name Temporarily Suspends Registration of Generics", from The Search Engine Report, Jan. 4, 2000, from at http://searchenginewatch.internet.com/sereport/00/01-realnames.html.
Tim Bray, "RDF and Metadata", from http://www.xml.com/xml/pub/98/06/rdf.html, 1998.
Ora Lassila, "Web Metadata: A Matter of Semantics", IEEE Internet Computing, Jul.-Aug. 1998.
Elizabeth Gardner, "Hollywood Marketers Debate Idea of URL for Every Movie", WebWeek, Jan. 19, 1998.
"Netword Receives Patent for Internet Keyword System", Netword.com Press Release, Jun. 16, 1999.
"Direct Hit Receives Funding From Draper Fisher Jarvetson", DirectHit.com Press Release, May 15, 1998.
"Direct Hit Signs Deal With Wired Digital's Hot Bot for Popularity Engine", DirectHit.com Press Release, Aug. 19, 1998.
DirectHit.com, Company & Background Articles and Frequently Asked Questions, from http://system.direchit.com/, Oct. 1998.
"Technology Overview" from DirectHit Web Site, www.directhit.com, printed Jun. 1999.

"Centraal Corporation Redefines Internet Navigation", Press release from realnames.com, Mar. 12, 1998, http://company.realnames.com/iwrelease.asp.

Michael Tchong, "Centraal Debuts", Mar. 11, 1998 ICONOCAST, from http://company.realnames.com/iconocast.asp.

"Access, Searching and Indexing of Directories (asid)", Jan. 1998, from http://www.ietf.cnri.reston.va.us/html.charters/asid-charter.html.

"GoTo.com, The First Ever Market-Driven Search Directory", GoTo.com Press Release, Feb. 21, 1998, from http://www.goto.com/release.html.

"URL Expansion Proposal", UseNet Thread, Jan. 1996.

Elizabeth Gardner, "Dislike Your URL? Now You Can Register a 'Netword'", WebWeek, Aug. 18, 1997.

"Netword LLC Receives Notice of Allowance", Netword.com press release, Dec. 9, 1997.

"Internet Keywords Give Consumers Direct Access to Online Resources", Netword.com Press Release, May 12, 1997.

"Why Use Networks?", Netword.com Web Site, Company Profile, FAQs, Feb. 1998 from http://www.netword.com.

R. Fielding, "How Roy Would Implement URNs and URCs Today", Internet Draft of the Internet Engineering Task Force (IETF), Jul. 7, 1995.

J. Klensin et al., "Domain Names and Company Name Retrieval", Internet Draft of the Internet Engineering Task Force (IETF), Jul. 29, 1997.

K. Sollins, "Architectural Principles of Uniform Resource Name Resolution", Informational Memo, Internet Society, Jan. 1998.

Tim Berners-Lee, "Web Architecture from 50,000 feet.", from http://www.w3.org/DesignIssues/Architecture.html., Sep. 1998.

S. Kille, "Using the OSI Directory to Achieve User Friendly Naming", Request For Comments: 1781, Internet Society, Mar. 1995.

"Global Brain To Offer Profile Searching", The Search Engine Report, Nov. 4, 1998.

S. Chakrabarti, "Mining The Web's Link Structure", Computer (IEEE), Aug. 1999.

Julie Pitta, "!&#$%.com", Forbes, Aug. 23, 1999.

J. Zittrain, "Keyword: Obsolete", Wired, Sep. 1998.

Scot Finnie, "You Can Get Satisfaction: Try IE5", Windows Magazine-Online, Jun. 1, 1999, Issue: 1006.

"Internet Explorer 3.0 for Windows 3.1 and NT 3.51: Tips and Tricks", on Microsoft Website, 1997.

"How To Search the Internet from the Address Bar In Internet Explorer", Microsoft Article ID: Q221754, www.microsoft.com, Jul. 17, 1999.

"Auto Search", from Microsoft Website, Mar. 18, 1999.

"Microsoft and Yahoo! Make Web Searches Easier For Microsoft Internet Explorer 3.0 Users Auto search to Feature Yahoo! Search Capabilities", Microsoft Media Alert, Aug. 13, 1996.

Ask Jeeves sample query, from www.askjeeves.com, Dec. 1999.

Ralph Swich et al., "Resource Description Framework (RDF)" and "Frequently Asked Questions about RDF", W3C Technology and Society Domain, printed Sep. 30, 1998 from http://www.w3.org/RDF and http://www.w3.org/RDF/FAQ.

"Why Use Google! Beta" and "Google! Beta Help" from http://www.google.com, 1999.

"What is Ask Jeeves", from http://www.askjeeves.com/docs/about/whatisaksjeeves.html, 1999.

"NBC's Snap.Com and GlobalBrain.Net Unveil Sophisticated New Technology And Services to Harness the Brain Power of Internet Users", http://www.globalbrain.net/html/release.html, Jun. 14, 1999.

GlobalBrain.net, Corporate-Technology, at http://www.globalbrain.net/html/technology.html, 1998-99.

M. MacLachlan, "Keywords Threaten Domain Name System", TechWeb, Nov. 9, 1998.

M. MacLachlan, "Netscape to Release Communicator 4.5 Beta", TechWeb, Jun. 17, 1998.

"Centraal Corporation: Company Background", from http://company.realnames.com/Backgrounder.asp, Mar. 1998.

Amy Dunlop, "Plotting an Internet Address Revolution", Internet World, Mar. 12, 1998.

Alex Lash, "A Simpler Net Address System", CNET NEWS.COM, Mar. 12, 1998.

"Startup Offers Net Addresses Sans Dots, Dashes", Reuters, Mar. 13, 1998, from http://www.zdnet.com/zdnn/content/reut/0312/293902.html.

Chris Sherman, "What's New With Web Search", onlineinc.com/onlinemag, pp. 27-31.

Jeff Pemberton, "Google Raises the Bar on Search Technology", Organizing the World's Information, onlineinc.com/onlinemag, pp. 43-46.

Greg R. Notess, "The Never-Ending Quest Search Engine Relevance", May/Jun. 2000, onlineinc.com/onlinemag, pp. 35-38.

Susan Feldman, "Find What I Mean, Not What I Say", May/Jun. 2000, www.onlineinc.com/onlinemag, pp. 49-56.

"Up and Cominyg Search Technologies", May/Jun. 2000, onlineinc.com/onlinemag, pp. 75-77.

"A.COMversation about Internet Search Engines", May 27, 2000, http://www.digitalmass.com/news/packages/click/roundtable1.html.

Shumeet Baluja, Vibhu Mittal, Rahul Sukthankar, "High Performance Named-Entity Extraction", http://www.ph.tn.tudelft.nl/PRInfo/reports/msg00431.html, Jun. 29, 1999, (abstract).

J.E. Kendall et al., "Information Delivery Systems: An Exploration of Web Pull and Push Technologies," Communications of the Association for Information Systems, vol. 1, Art. 14, Apr. 1999.

K.E. Kendall, "Artificial Intelligence and Götterdämerung: The Evolutionary Paradigm of the Future," The DATA BASE for Advances in Information Systems, vol. 27, No. 4, Fall 1996, pp. 99-115.

S. Alter, "A General, Yet Useful Theory of Information Systems," Communications of the Association for Information Systems, vol. 1, Art. 13, Mar. 1999.

T. Bray et al., "Extensible Markup Language (XML) 1.0 W3C Recommendation Feb. 10, 1998," REC-xml-19980210, http://www.w3.org/TR/1998/REC-xml-19980210, Feb. 10, 1998.

Anonymous, "XML: Enabling Next-Generation Web Applications," Microsoft Corporation, http://msdn.microsoft.com/archive/en-us/dnarxml/html/xmlwp2.asp?frame=true, Apr. 3, 1998.

Anonymous, "UDDI Technical White Paper," http://www.uddi.org/pubs/lru_UDDI_Technical_White_Paper.pdf, Sep. 6, 2000.

Anonymous, "Electronic Business XML (ebXML) Requirements Specification—ebXML Candidate Draft Apr. 28, 2000," http://www.ebxml.org/specdrafts/RSV09.htm, Apr. 28, 2000.

Anonymous, "BizTalk™ Framework 1.0 Independant Document Specification," BizTalk Enabling Software to Speak the Language of Business, Microsoft Corporation, Nov. 30, 1999.

Philip Costa, "Navigating the Sea of XML Standards," Giga Information Group, Dec. 14, 1999.

J. Klensin et al., "Domain Names and Company Name Retrieval," RFC2345, Network Working Group Request for Comments: 2345, May 1998.

"What is 1Jump," available at http://www.1jump.com/about.html as of Nov. 11, 1999.

Boris Chidlovskii et al., "Collaborative Re-Ranking of Search Results", AAAI-2000 Workshop on AI for Web Search, Online, Jul. 30, 2000, XP002250910.

Alton-Scheidl R. et al., "Select: Social and Collaborative Filtering of Web Documents and News", Proceedings of the 5th ERCIM workshop on user interfaces for all: user-tailored information environments, Online, Nov. 28, 1999-Dec. 1, 1999, XP002250911.

Andreas Paepcke et al., "Beyond Documents Similarity: Understanding Value-Based Search and Browsing Technologies", Sigmond Record, ACM, USA, Online, vol. 29, No. 1, Mar. 2000, pp. 80-92, XP002250912.

* cited by examiner

FIG. 4

Index Sample - Task/Domain

| Tasks T= | Q's | Compound | Pass Targets | Raw Score | Exp. Avail | Probability (Task/Domain) |
|---|---|---|---|---|---|---|
| 1 | Single Element Q (a) | | T1 T2 ... | Sa1T1 | Ea1T1 | Pa1T1 |
| 1 | Q (a) | 0 | | | | |
| 1 | Q (b) | 0 | | | | |
| 1 | Compound Q (c) | 1 | | | | |
| 2 | Single Q (a) | 0 | | | | |
| 2 | Q (d) | 0 | | | | |
| ...n | Compound Q (e) | 1 | | | | |
| x | Single Q (a) | 0 | T1 T2 ... | SaxT1 | EaxT1 | PaxT1 |
| x | Q (f) | 0 | | | | |
| x | Compound Q (g) | 1 | | | | |
| $x_1$ | Q (a) | 0 | T1 T2 ... | $Sax_1T1$ | $Eax_1T1$ | $Pax_1T1$ |
| $x_1$ | Q (b) | 0 | | | | |
| $x_1$ | Q (c) | 1 | | | | |
| $x_2$ | Q (a) | 0 | | | | |

← Known Tasks | Unknown Tasks →

TASK/DOMAIN SEGMENTATION IN APPLYING FEEDBACK TO COMMAND CONTROL

BACKGROUND OF THE INVENTION

1. Field of the Invention

The present invention is directed to an improved method and apparatus for the utilization of user feedback particularized to a specified or inferred task, to improve the ability to respond accurately to user commands.

2. Description of the Related Art

The development of the World Wide Web (hereinafter, the Web), a subset of the Internet that includes all connected servers offering access to Hypertext Transfer Protocol (HTTP) space, has greatly increased the popularity of the Internet in recent years. To navigate the Web, browsers have been developed that enable a user of a client computer connected to the Internet to download Web pages (i.e., data files on server electronic systems) written in HyperText Mark-Up Language (HTML). Web pages may be located on the Web by means of their electronic addresses, known as Uniform Resource Locators (URLs), which uniquely identify the location of a resource (web page) within the Web. Each URL consists of a string of characters defining the protocol needed to access the resource (e.g., HTTP), a network domain name, identification of the particular computer on which the resource is located, and directory path information within the computer's file structure. The domain name is assigned by Network Solutions Registration Services after completion of a registration process.

Search engines have been developed to assist persons using the Web in searching for web pages that may contain useful information. One type of search engine, exemplified by Altavista, Lycos, and Hotbot, uses search programs, called "web crawlers", "web spiders", or "robots", to actively search the Web for pages to be indexed, which are then retrieved and scanned to build indexes. Most often this is done by processing the full text of the page and extracting words, phrases, and related descriptors (word adjacencies, frequencies, etc.). This is often supplemented by examining descriptive information about the Web document contained in a tag or tags in the header of a page. Such tags are known as "metatags" and the descriptive information contained therein as "metadata". Another type of search engine, exemplified by Yahoo (www.yahoo.com), does not use web spiders to search the web. Instead, these search engines compile directories of web sites that editors deem to be of interest to the users of the service and the search is performed using only the editor-compiled directory or directories. Both types of search engines output a listing of search results believed to be of interest to the user, based upon the search term or terms that the user input to the engine.

Recently, search engines such as DirectHit (www.directhit.com) have introduced feedback and learning techniques to increase the relevancy of search results. DirectHit purports to use feedback to iteratively modify search result rankings based on which search result links are actually accessed by users. Another factor purportedly used in the DirectHit service in weighting the results is the amount of time the user spends at the linked site. The theory behind such techniques is that, in general, the more people that link on a search result, and the longer the amount of time they spend there, the greater the likelihood that users have found this particular site relevant to the entered search terms. Accordingly, such popular sites are weighted and appear higher in subsequent result lists for the same search terms.

The Lycos search engine (www.lycos.com) also uses feedback, but only at the time of crawling, not in ranking of results. In the Lycos search engine, as described in U.S. Pat. No. 5,748,954, priority of crawling is set based upon how many times a listed web site is linked to from other web sites. The Google search engine (www.google.com) and IBM's Clever system use such information to rank possible hits for a search query.

Two of the important techniques available to assist in locating desired Web resources will be referred to hereinafter as discovery searching and signifier mapping. In discovery searching, a user desires all, or a reasonable number of, web sites highly relevant to entered search terms. In such searching, the criterion for a successful search is that as many of the highly relevant web sites as possible be discovered and presented to the user as prominently as possible. In signifier mapping, a user enters a guessed name or signifier for a particular target resource on the Web. The criterion for a successful signifier mapping is that the user is provided with the URL of, or connected to, the specific target resource sought.

One attempt to provide the ability to map a signifier, or alias, to a specific URL utilizes registration of key words, or aliases, which when entered at a specified search engine, will associate the entered key word with the URL of the registered site. This technique is implemented commercially by NetWord (www.netword.com). However, the NetWord aliases are assigned on a registration basis, that is, owners of web sites pay NetWord a registration fee to be mapped to by a particular key word. As a result, the URL returned by NetWord may have little or no relation to what a user actually would be looking for. Another key word system, RealNames (www.realnames.com), similarly allows web site owners to register, for a fee, one or more "RealNames" that can be typed into a browser incorporating RealNames' software, in lieu of a URL. Since RealNames also is registration based, there once again is no guarantee that the URL to which is user is directed will be the one he intended.

Related to search techniques are preference learning and rating mechanisms. Such mechanisms have been used, for example, in assessing customer satisfaction or in making recommendations to users based on what customers with similar interests have purchased in the past. In existing preference learning and rating mechanisms, such as collaborative filtering (CF) and relevance feedback (RF), the objective is to evaluate and rank the appeal of the best n out of m sites or pages or documents, where none of the n options are necessarily known to the user in advance, and no specific one is presumed to be intended. It is a matter of interest in any suitable hit, not intent for a specific target. Results may be evaluated in terms of precision (whether "poor" matches are included) and recall (whether "good" matches are omitted).

A search for "IBM" may be for the IBM Web site, but it could just as likely be for articles about IBM as a company, or articles with information on IBM-compatible PCs, etc. Typical searches are for information about the search term, and can be satisfied by any number of "relevant" items, any or all of which may be previously unknown to the searcher. In this sense there is no specific target object (page, document, record, etc.), only some open ended set of objects which may be useful with regard to the search term. The discovery search term does not signify a single intended object, but specifies a term (which is an attribute associated with one or more objects) presumed to lead to any number of relevant items. Expert searchers may use searches that specify the subject indirectly, to avoid spurious hits that happen to contain a more direct term. For example, searching for information about the book Gone With The Wind may be better done by searching for Margaret Mitchell, because the title will return too many irrelevant hits that are not about the book itself (but may be desired for some other task).

In other words, the general case of discovery searching that typical search engines are tuned to serve is one where a search is desired to return some number, n, of objects, all of which are relevant. A key performance metric, recall, is the completeness of the set of results returned. The case of a signifier for an object, is the special case of n=1. Only one specific item is sought. Items that are not intended are not desired—their relevance is zero, no matter how good or interesting they may be in another context. The top DirectHit for "Clinton" was a Monica Lewinsky page. That is probably not because people searching for Clinton actually intended to get that page, but because of serendipity and temptation—which is a distraction, if what we want is to find the White House Web site.

Many self-contained document search systems, such as Lexis/Nexis and Medline have long exploited semantic metadata, machine-readable information as to the content and type of an associated document available on a network, to enable users to more effectively constrain their searches. Thus in searching for the Times review of Stephen King's new book, a user might explicitly search for "pub-name=Times and content-type=review and author=King." Search systems have enabled searchers to exploit this explicitly in their query language, and attempts at natural language searching have sought to infer such semantics. However, because of the small user population of such systems, there has been no attempt to utilize feedback to improve search results in such systems.

Further, it has been recognized that different people using the same search terms when searching may expect or desire different results. For example, in the context of discovery searching, it has been postulated that when a man enters the search term "flowers" in a search engine, he is likely to be interested in ordering flowers, whereas when a woman enters the same search term, she is more likely to be seeking information about flowers. Some currently existing search engines, such as DirectHit (www.directhit.com) and Global-Brain (www.globalbrain.net), purport to take gender and other demographic data, such as country, race, and income, into account in formulating results for searches. However, prior art search techniques such as these do not take into account the type of task/domain the user is working in when deciding what results would be desired, nor do the techniques utilize iterative learning based on experiential data or feedback particularized to the task/domain.

There is therefore a need to provide a method for calibrating the use of feedback in searching and other command-responsive control techniques, such as robot control, so as to correlate accumulated user feedback with the particular task/domain being performed by the user.

There also is a need to develop a technique of using semantic metadata for use in search systems having a large user population to assist in determining the task/domain of the user and then to use feedback specific to that task/domain.

SUMMARY OF THE INVENTION

In view of the above-mentioned deficiencies of the prior art, it is an object of the present invention to provide a method of utilizing heuristic, adaptive feedback-based techniques, while at the same time customizing use of the feedback to particular tasks or domains. According to one advantageous aspect of the present invention, in applying learning techniques to searches or signifier mapping, or to more general control techniques, particularized learning and experiential data gathered during previous iterations of the same or similar tasks is used, and feedback gathered from different types of tasks is ignored, or at least given less weight, when formulating responses to user commands.

Note that the term "task" is used to refer generally to the concept of a specific task, the term "domain" is used to refer generally to the concept of a specific domain of discourse, and the term "task/domain" is used to refer to a task and/or a domain.

In accordance with the above objects, in accordance with one aspect of the present invention, there is provided an apparatus for responding to a current user command associated with one of a plurality of tasks. The apparatus comprises: means for storing cumulative feedback data gathered from multiple users during previous operations of the apparatus and segregated in accordance with the plurality of tasks; means for determining the current task with which the current user command is associated; means for determining a current response to the current user command on the basis of that portion of the stored cumulative feedback data associated with the current task; means for communicating to the user the current response; and means for receiving from the user current feedback data regarding the current response. The current feedback data is added to the cumulative feedback data stored in the storing means and associated with the current task.

In accordance with another aspect of the present invention, there is provided a method for responding to a current user command associated with one of a plurality of tasks. The method comprises the steps of: determining the current task with which the current user command is associated; determining a current response to the current user command on the basis of previously gathered and stored feedback data associated with the current task; communicating to the user the current response; receiving from the user current feedback data regarding the current response; and storing the current feedback data. The stored current feedback data is added to cumulative feedback data gathered and stored during previous iterations of the method and associated with the current task.

In accordance with yet another aspect of the present invention, there is provided a computer-readable storage medium storing program code executable by a program-controlled apparatus. The code is operable to cause the apparatus to: determine the current task with which the current user command is associated; determine a current response to the current user command on the basis of previously gathered and stored feedback data associated with the current task; communicate to the user the current response; receive from the user current feedback data regarding the current response; and store the current feedback data. The stored current feedback data is added to cumulative feedback data gathered and stored during previous executions of the code and associated with the current task.

In accordance with still another aspect of the present invention, there is provided an apparatus for responding to a current user command associated with one of a plurality of tasks. The apparatus comprises: a digital storage device that stores cumulative feedback data gathered during previous operations of the apparatus and segregated in accordance with the plurality of tasks; a first digital logic device that determines the current task with which the current user command is associated; a second digital logic device that determines a current response to the current user command on the basis of that portion of the stored cumulative feedback data associated with the current task; a first communication interface that communicates to the user the current response; and a second communication interface that receives from the user current feedback data regarding the current response. The current feedback data is added to the cumulative feedback data stored in the digital storage device and associated with the current task.

In one preferred embodiment of the present invention, the task/domain is ascertained by simply asking the user. This may preferably be accomplished by creating different search tools for different task/domains. In this scenario, a single server program, in accordance with the elicited response of the user, uses different on-board or remote search and mapping facilities, such as search engines, or white pages, with correlated experiential feedback data for the particular task, to satisfy the user. Alternately, the feedback can be gathered from the user after the initial search, to further focus the search.

According to a second preferred embodiment of the present invention, the user's task is inferred by the system. Preferably, this inference is made by tracking individual behavior, analyzing it, and breaking it down into clusters or work episodes that have evident similarity of usage, thus separating task episodes for a given user. The feedback from those tasks can be isolated for the particular user, and feedback from multiple users who seem to be working on similar tasks is grouped together to apply task specific feedback, in isolation from feedback for other tasks. Moreover, feedback from a current episode and/or feedback from previous episodes may be used. In addition, past and/or current feedback gathered by the current user may be weighted differently from past and/or current feedback from the population of all users.

Preferably, the task is inferred by tracking user activity and, where available, utilizing semantic metadata existing on Web pages visited by the user.

The above-described learning, whether it be gleaned from user response or from inference, allows the present invention to utilize feedback and heuristics from a signal that contains reduced extraneous "noise" information, i.e., information from different, possibly unrelated tasks, by filtering the same from the signal.

BRIEF DESCRIPTION OF THE DRAWINGS

FIG. 4 illustrates a data structure for storing task/domain-specific user feedback and results.

DETAILED DESCRIPTION OF THE PREFERRED EMBODIMENTS

Figure 1A:
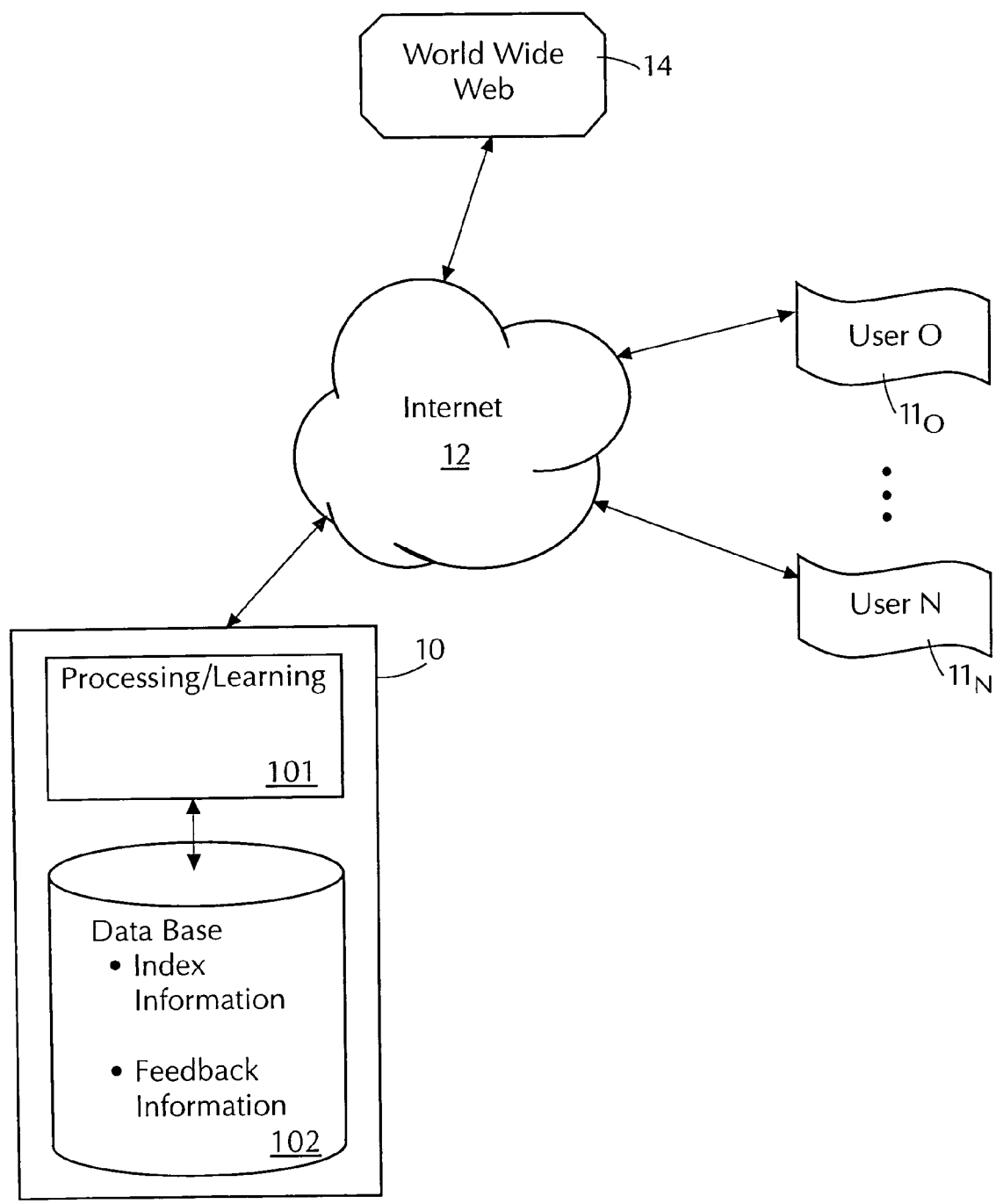
FIG. 1A is an architectural block diagram of a server computer system internetworked though the Internet in accordance with a preferred embodiment of the present invention.

FIG. 1A shows a preferred embodiment of the present invention as implemented in a server on the Internet. Server 10 includes a computer or computers that perform processing, communication, and data storage to implement the present invention. Server 10 includes a processing/learning module 101 that performs various processing functions, and includes a communication interface to transmit and receive data to and from the Internet 12, as well as with database 102, and is programmed to be operable to learn from experiential feedback data by executing heuristic algorithms. The module 101 contains hardware that is programmed to ascertain a user task/domain by methods to be discussed below. Database 102 stores indexes of URL data that would allow the module 101 to locate a URL on the Web that is responsive to a user's search or mapping request. Preferably, the indexes store, in addition to available URL information, such as domain name directories, information obtained by web crawlers as well as indexes to web sites and individual pages or other resources generally, and information relating to the experience of the server and corresponding user feedback in previous executions of the service. As the server 10 gains experience and user feedback, heuristic techniques are applied by module 101 to enable the responses returned to users to conform more and more accurately to user expectations.

Users $11_0$–$11_N$ can access the Internet 12 by means of client computers (not shown) either directly or though an Internet service provider (ISP). In discovery searching, the user enters a search term into the browser, or on a form downloaded from the server. In signifier mapping, the user enters a guessed name, or alias, into the browser and submits a query containing the alias to the finder server. The World Wide Web 14 includes computers supporting HTTP protocol connected to the Internet, each computer having associated therewith one or more URLs, each of which forming the address of a target resource. Other Internet information sources, including FTP, Gopher and other static information sources are not shown in the figure but can be treated similarly.

In addition to be above, the finder server includes operating system servers for external communications with the Internet and with resources accessible over the Internet. Although the present invention is particularly useful in discovering and mapping to Internet resources, as was discussed above, the method and apparatus of the present invention can be utilized with any network having distributed resources, and even more generally to any system designed to respond to user commands.

Figure 1B:
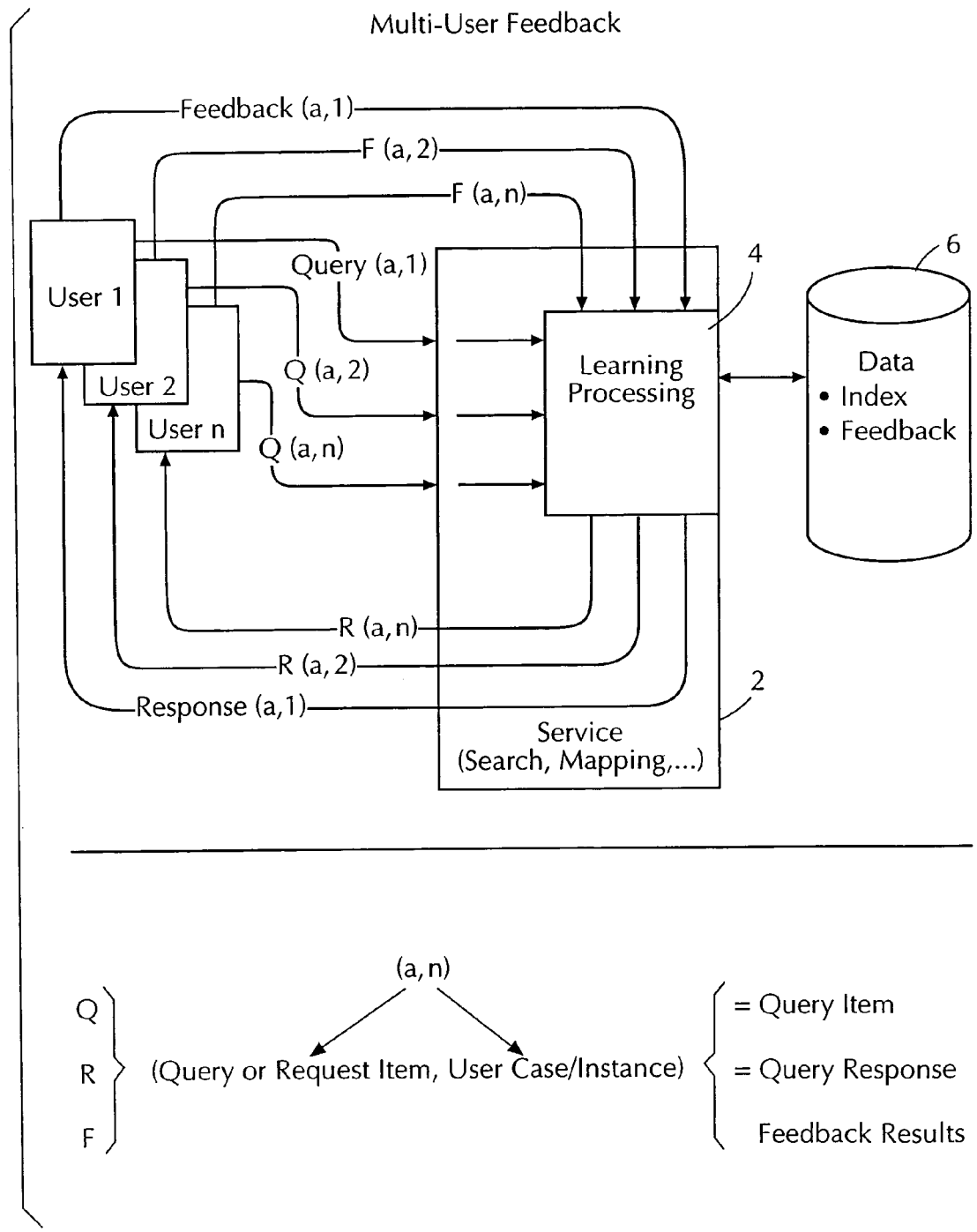
FIG. 1B is a flow diagram illustrating a general technique for obtaining and learning from user feedback.

FIG. 1B is a flow diagram illustrating a general technique for obtaining and learning from feedback responses gathered from a large group of people, in the example, users 1, 2, . . . n. Such a technique can be used in a variety of applications, and in particular in traditional search engines, or in mapping to identify particular web sites, as in alias or signifier mapping. The use of such a technique will result, over time, in an experiential data base useful for application of heuristic algorithms.

In FIG. 1B, users 1, 2, . . . n represent a large community of users. In the flow diagram, the flow of query items from the users is indicated by a Q, the flow of responses back to the users is indicated by an R, and the flow of feedback results provided by the users' actions, or responses to inquiries, is indicated by an F. As can be seen from the figure, Query (a, 1) (where a is the query term) is transmitted from user 1 to the service 2, which can either be a searching or a mapping service. The service has learning processor 4, which interfaces with a database 6. The database 6 contains, among other things, indexes and feedback information gathered from previous queries. In response to the query, the user 1 is provided with a response R(a, 1). User 1 then is provided with the opportunity to transmit user Feedback (a, 1) to the Service 2. Learning processor 4 stores the feedback information in the database 6, and is programmed with one or more heuristic algorithms enabling it to learn from the feedback information to improve the returned search or mapping results. The feedback provided will improve the results offered, for example by positively weighting results preferred by users, so that, over time, more accurate results can be obtained.

As is described above with respect to FIGS. 1A and 1B, feedback can be used to improve search and mapping results by weighting search results on the basis of the feedback information. For example, if the feedback to be used relates to the popularity of a link on a list of such links, the links that are clicked most often would over time be accorded greater weight and appear in a more prominent position in subsequent iterations of the search, for the same search terms.

While feedback of a general nature as gathered by the above method is generally valuable to every kind of search, such information would be considerably more valuable if it were filtered to include only feedback from task/domains similar to the one currently being performed. For example, in a preferred embodiment of the present invention, feedback gathered by users doing signifier mapping is stored separately from feedback gathered from users doing discovery searching. Similarly, feedback for each of many finer breakdowns of task/domain would also be segregated. In this way, a user is matched with feedback from people doing the same task and/or working in the same semantic domain.

In view of the foregoing, in accordance with the present invention, two basic approaches to determining the task/domain to be (or being) performed:

1) Asking the user; and
2) Inferring the task/domain from current and previous user behavior.

When the first approach is utilized, the present invention is preferably implemented by creating different search tools for different task/domains. For example, the server preferably includes both a signifier mapping tool as well as a discovery search tool. Preferably, in the first approach, the single search service provided by the server asks users to indicate the type of request they are making, such as by selecting from multiple qualifiers, such as a people search that selects for phone or e-mail. Alternatively, in a hybrid of the two, the inquiry can be made after an initial search, by asking the user if the results were acceptable and inviting the user to elaborate on the task/domain that is intended while in the course of confirming the results or refining the request.

When the second approach is utilized, heuristic techniques are used to track individual behavior and analyze it, in order to break it up into clusters or work episodes that have evident similarity of usage, thus separating task/domain episodes for a given user. The system then isolates the feedback from those task/domains accordingly, and groups feedback from multiple users who seem to be working on similar task/domains together to apply task/domain specific feedback, in isolation from feedback for other task/domains.

Preferably, click stream traces, such as Alexa, or other similar usage trackers, are used to perform such tracking. Episodes are preferably modeled in terms of working sets of clicks, pages and links, that are clustered within a predetermined or heuristically defined threshold based on measures of similarity of subject areas or other descriptive metadata, and in activity behavior patterns such as frequency of interactions, clustering of interactions in a given site or set of related sites, etc. Tasks have a duration, preferably in terms of number of clicks or, alternatively, in terms of minutes, and are typically contained within a single session. Such task/domain identifications and associated learning is treated as a temporary hypothesis subject to confirmation by further feedback and testing. More advanced methods can be used to distinguish and identify overlapping episodes involving multiple distinct task/domains, such as by using heuristic techniques similar to those used for identifying "episode treatment groups" in health care claims data streams, such as those described in U.S. Pat. No. 5,835,897 to Dang.

An example of a broad task/domain is signifier/object searching or mapping, searching for specific object types being a finer task/domain. Robot command translation is another broad task/domain, as is open-ended discovery searching. Constrained discovery searching, such as is currently offered by some search engines, to constrain results to Web pages, or news group items, or other specific content types, is yet another task/domain. Such task/domains can be defined in increasingly fine terms, from the broad domains currently offered by some search engines (yellow pages, white pages, email addresses, Web pages, usenet pages, etc.) or the finer groupings (or hierarchies or multidimensional arrays of groupings) that may be specific to various sub-domains (such as restaurants in Manhattan, corporate Web sites, books on programming languages, etc.). Such finer breakdowns are commonly found in specialized database search services, such as the Zagat guide or the Amazon catalog. Task/domains may also correspond to the various cubes of multidimensional data associated with specific data mining tasks.

By applying the approach of the present invention to assist in distinguishing such task/domains from a single search interface, it becomes possible to create search services that combine levels of breadth of coverage with depth and precision that would not otherwise be achievable. While the present discussion focuses primarily on integrated version of such a search or mapping service, it will be apparent to those skilled in the art that various distributed and cooperative versions of such techniques (such as metasearch engines that invoke parallel independent searches or mappings of many sources, domains, and databases, and that variant techniques may be used for each) may also be developed using the principles described here.

Figure 2:
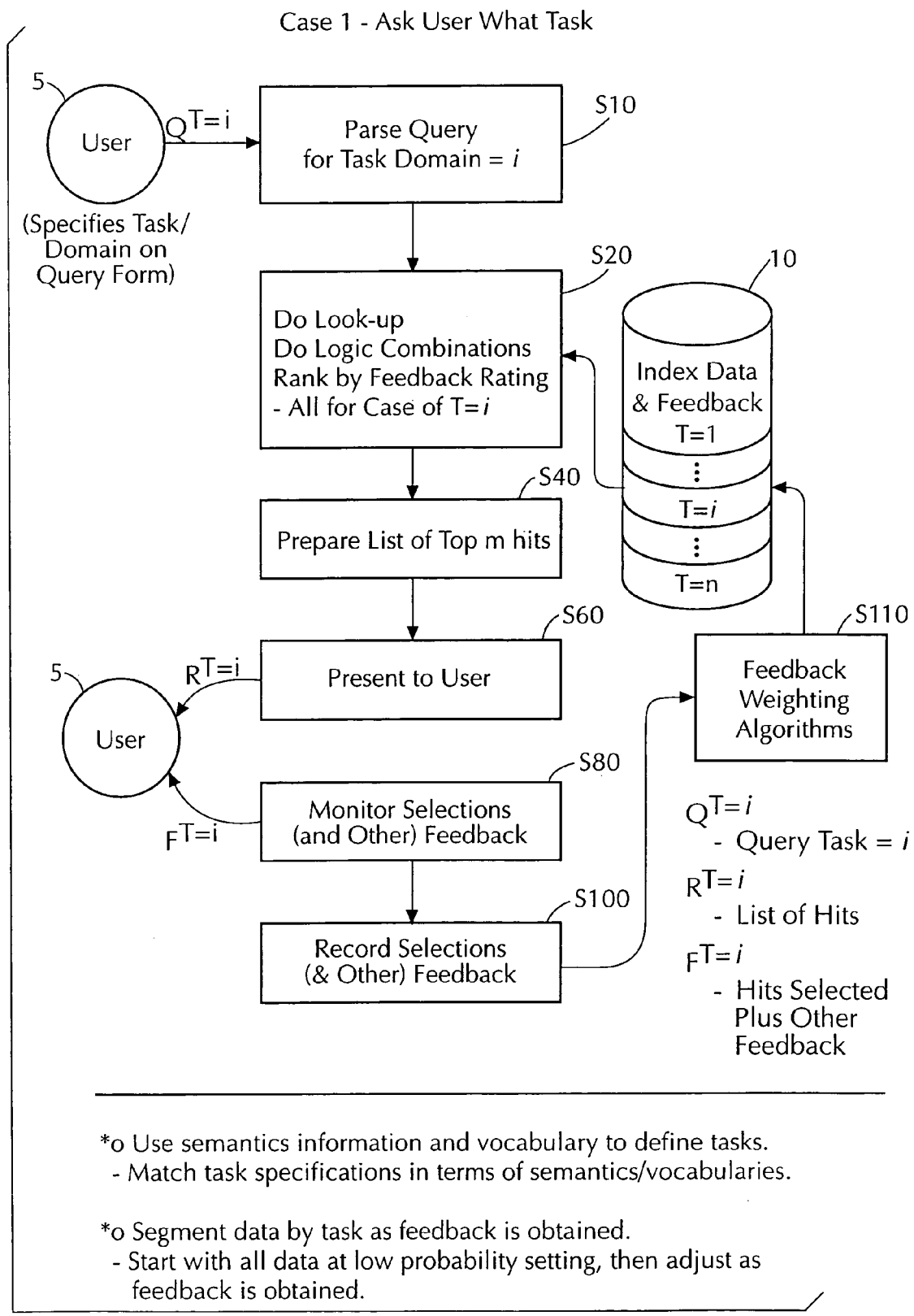
FIG. 2 illustrate a method of utilizing task/domain-specific user feedback in responding to user, where the task/domain is specified by the user.

FIG. 2 illustrates a first embodiment of the present invention that employs feedback, gathered and segregated by task/domain, in a heuristic manner. For the first embodiment, the user is queried as to which task/domain, or mode, is currently being performed.

As shown in the figure, user 5 specifies the task/domain he intends to pursue on a query form, for example by selecting radio buttons on the search form. For purposes of example, in the current iteration illustrated in the figure, the user has selected task/domain i, and the query related to that task/domain is designated $Q^{T=i}$. The query is then parsed to identify the search term or mapping request and any specified attributes, at step S10, and is identified as being for task/domain=i. At step S20, a lookup is performed by accessing database 10, which stores index data and task/domain-segregated feedback data. The stored feedback data is segregated for each task/domain $T=i \ldots T=n$. Also, in step S20, logic combinations if needed for compound natural language or boolean queries are performed, and results are ranked by feedback rating of confidence level, all for the case of T=i. In the preferred embodiment, a list of the top m hits is prepared at step S40 and presented, as results $R^{T=j}$, to the user at step S60. The user 5 supplies feedback, either explicitly or implicitly, preferably by selecting one or more links and spending varying amounts of time visiting the selected link or links. This user feedback is indicated in the figure as $F^{T=i}$. At step S80, the link selections, and other feedback, such as user responses to inquiries, are monitored. At step S100, the selection and other feedback data is recorded, and in step S110, applied to feedback weighting algorithms. The results of the weighting are stored in data base 10 for use in subsequent iterations of the method.

Figure 3:
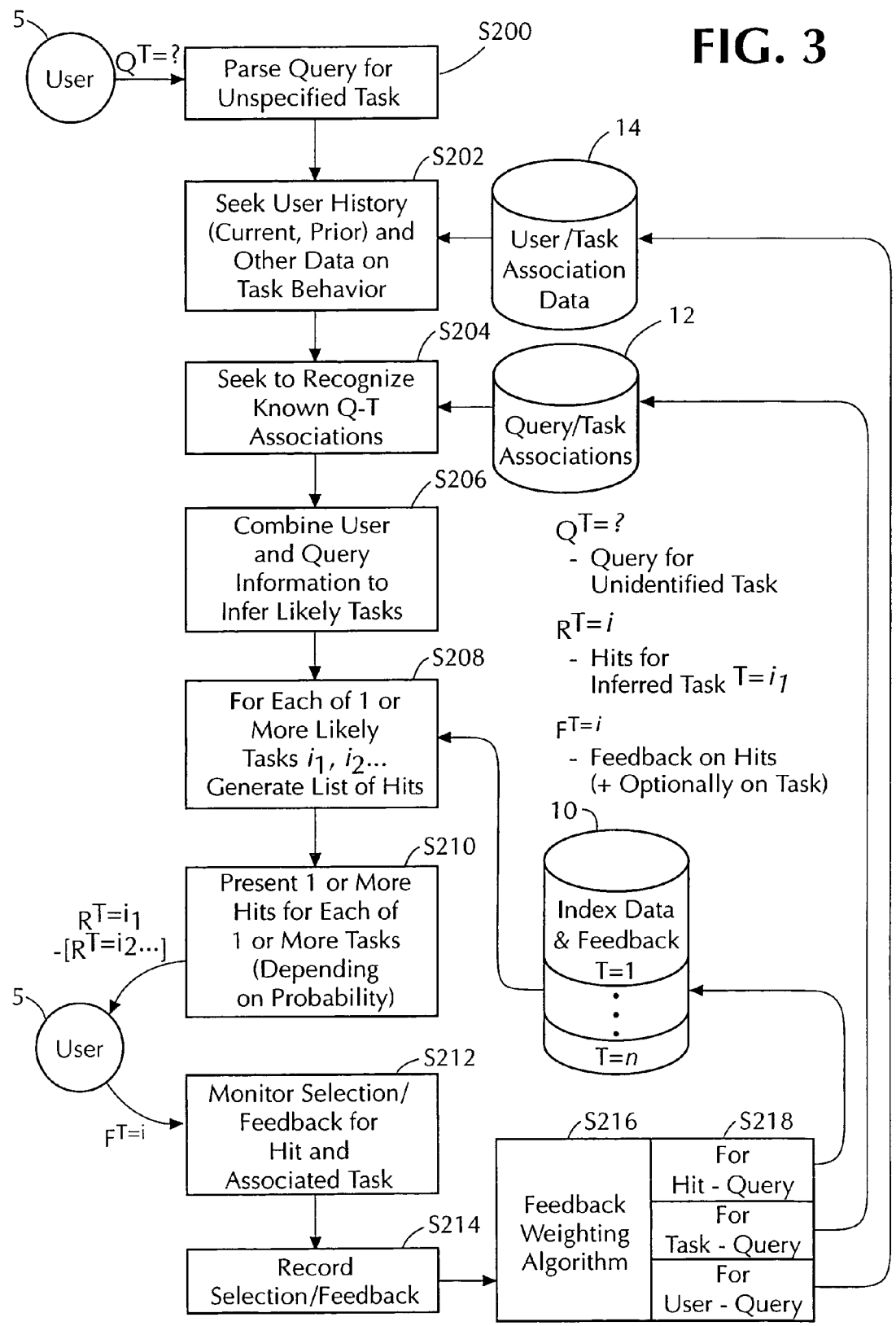
FIG. 3 illustrates a method in accordance with a second embodiment of the present invention in which the user's task/domain is inferred by studying user activity using heuristic techniques.

FIG. 3 illustrates a method in accordance with a second embodiment of the present invention in which the user's task/domain is inferred using heuristic techniques.

As illustrated in the figure, the user 5 enters a query relating to a task/domain as yet undetermined by the system. In the figure, the query is designated as $Q^{T=!}$. At step S200, the query is parsed for an unspecified task/domain to identify the search term or mapping request and any specified attributes. At step S202, the system seeks user history, including current history (current session) and prior history, and other data as to the particular user's task/domain behavior, from user/task/domain associated data database 14. At step S204, the system seeks to recognize known Query/Task/domain associations based on prior experience with similar queries and behavior patterns of relevant populations of users by tapping into the query/task/domain associations database 12. At step S206, user and query information is combined to infer likely task/domains. This may be based on any of a variety of algorithms which may draw on traditional techniques for inference, mapping, searching, or pattern recognition, which are preferably combined with supplementary learning-based techniques that draw on and heuristically weight the experience feedback on either or both of user/task/domain associations and query/task/domain associations to rank highest the task/domains most commonly associated with the current user and the current query. For each of one or more likely task/domains $i_1, i_2, \ldots i_n$, at step S208 a list of hits responsive to the query is generated. These lists are generated using index and feedback data stored in database 10, the data being segregated by task/domain, and only (or preferentially) feedback corresponding to the respective task/domain is used in generating the list for the particular task/domain. At step S210, one or more hits is presented to the user 5 for each of one or more task/domains. The list are ordered in order of probability. At step S212, selection/feedback for hit and associated task/domain are monitored, and at step S214, the selection and feedback are recorded. Next, at step S216, a feedback weighting algorithm is applied to the received information. At step S218, appropriate feedback information is fed back to the appropriate database for use in subsequent iterations of the system.

FIG. 4 illustrates an example of a data structure that is preferably stored in the database of the present invention. The data structure is shown in the figure in the form of a table, but the actual structure may be in any form capable of representing the matrix defined by the figure.

As can be seen from the figure, the database stores queries, gathered from previous experience with users, in addition to initially entered expected common queries which may be derived from conventional indexes or directories (and this may be done with or without task/domain/domain specificity). Naturally, as the system is used, the number of stored queries obtained in actual usage increases. Each query may be stored in several locations. For example, Q(a) is stored in correspondence with task/domain 1, as well as in possible correspondence with one or more other task/domains 2 . . . n. The same is true for Q(a), Q(b) . . . Q(z), etc. Each query, for each task/domain for which it has been seen and identified to occur, has a set of data associated therewith.

Examples of such data are shown in the column headings. The "possible targets" column includes likely hits T1, T2, etc., for the particular query. These targets are stored in association with ranking/weighting factors that may be used to score and order the preference of results, as shown in the headings. Note that the ranking of the targets may be different for each task/domain, since different feedback is used to order the targets per task/domain. Linked to each of these query/target pairs in the example format shown is a raw score (Sa1T1, for query a, within task/domain 1, and having target T1), an experience level (Ea1T1), and a probability factor (Pa1T1), all specific to the given task/domain (and thus Bayesian). As feedback enters the system, the index data is updated to reflect the user feedback.

The basic task/domain-oriented table shown in the upper portion of FIG. 4 can be extended as shown in the lower portion to allow experience from known task/domains to be used (with lower assurance of relevance) for unidentified task/domains (task/domain x), much as initial non-feedback-derived data is used, thus making maximum use of all experience. That data can be organized in alternative ways, which may be more efficient or easy to program, including adding additional columns for such data. Here a duplicate set of listings is maintained, with raw scores and experience levels that are low relative to the total domain (e.g., n total experience values for task/domain i, out of m values for all task/domains), leading to a lower probability factor for unidentified task/domains. For identified task/domains, the experience set is a fraction of the total so a given experience level warrants a higher probability factor within that domain. Thus initial loading of the table could be for task/domain=x, if general data is obtained from a non-task/domain specific learning process, and even if started with task/domain-oriented learning, would be heavily loaded with the unidentified task/domain=x until significant task/domain-specific data could be learned. In general, Bayesian probability analysis techniques may be employed to make maximum use of the task/domain that queries and feedback information are known or inferred to relate to.

The Possible Targets are URLs (in the Web case), and shown here as T1, T2, . . . . The Experience level indicates the number of feedback instances corresponding to a given Raw score for a given Target as relating to a given Query for a given Task/domain. The section for task/domains 1-$n$ is for data corresponding to experience for known task/domains, for application to queries for known task/domains. The section for task/domain=x is for experience data (or other pre-loaded index data) not identifiable with any task/domain. The experience level is EaxT1, which taken alone leads to a probability PaxT1 for an unknown task/domain, just as with learning-based techniques that are non-task/domain specific. Such a probability would generally be lower than in the case where the task/domain was known.

The sections $X_1$–$X_n$ are for supplemental tracking of experience obtained for known task/domains 1-$n$, but showing reduced experience and probability levels for application of that data for use in broader cases where the task/domain (for a subsequent query) is unknown (just as for the task/domain-x case). Where a given query Q(a) has not been identified with a task/domain, but is found to occur in multiple rows (in the lower sections, for use for subsequent unknown task/domains), corresponding to task/domain experience from multiple task/domains (or the unknown task/domain), as shown for X, $X_1$, and $X_2$, the algorithm could apply all of that experience by adjusting the raw scores in light of the experience levels to calculate a composite probability level (not shown). These experience levels would relate the level of experience relative to the total experience for all task/domains, unlike the known-domain experience levels, which are local to that task/domain, and relative only to that body of experience. This is because a relatively small experience base may lead to high confidence within a task/domain, but low confidence relative to a larger universe of data for an uncertain mix of task/domains. In general, experience levels indicate the number of relevant feedback responses out of a total experience base, both for an identified task/domain and globally. Where a query task/domain is known, only the portion of experience for that task/domain would be most relevant, but where it is not known, then a wider base must be assessed—a variety of Bayesian or other probabilistic inference techniques can be applied in such cases.

If an unknown query is matched to a set of rows corresponding to a set of task/domains, that allows inference that it might relate the query to one of those task/domains. If one such task/domain dominates, its probability of being the intended task/domain can be presumed to be higher. Thus this matching of task/domains and weighting with their levels of experience enables inference of likely intended task/domains in the implicit case. Just as with the signifier mapping problem (non task/domain specific), in which we can assign relative probabilities based on the relative frequency of positive feedback for a possible mapping, we can do the same here for mappings of queries to task/domains based on the relative frequency of cases where such mappings of a query to one or more task/domains have been established, and can set thresholds for confidence that a possible mapping to a task/domain is the intended mapping.

Also shown is one of many possible ways to deal with compound queries, such as those containing phrases or Boolean expressions. These could be addressed simply by applying appropriate logic to the table entries for each of their component elements, but additional precision in maintaining and applying feedback can be achieved by maintaining such data for each specific compound query (possibly bounded by some complexity limit, such as no more than n elements). In this example, each compound query is treated as a distinct query, with its own row, and its own associated experience and scores. Note that in the table example shown, the column headed Compound simply contains flags that denote which queries are compound (and the indications "single element" and "compound" are clarifications to the reader that would not actually be stored in the table).

While the index shows preferred weighting criteria, these are only a sample of the kind of criteria that can be correlated to the query/target pairs. In a simple embodiment, the raw score would be based only on feedback on selections of hits. Other embodiments could add feedback data on time spent at a target and explicit feedback on relevance. Additional variations would include weighting based on the recency of the feedback, and on the inclusion of non-feedback data, such as the various syntactic and semantic criteria used for relevance weighting by conventional search engines.

Figure 5A:
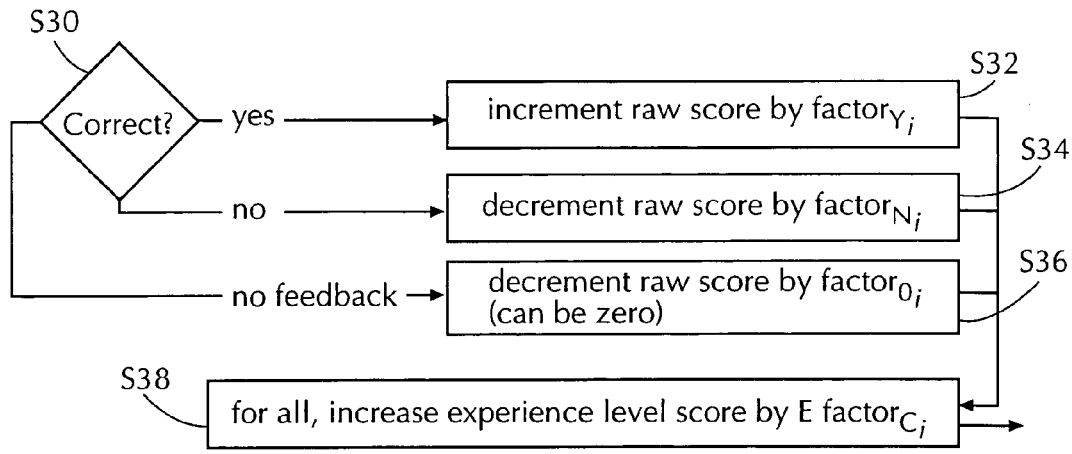
FIGS. 5A and 5B are flow diagrams illustrating a technique of feedback weighting in signifier mapping or discovery searching.

FIG. 5A illustrates a preferred technique for weighting the results from a particular task/domain i, using feedback data for single results presented to the user, as in probable results from signifier mapping. In step S30, if the user feedback from the probable result indicates that the probable was in fact the target the user was searching for, the flow proceeds to step S32 where the raw score for that query/target pair is incremented by factory. If the user returns feedback indicating that the probable was not the target resource the user had in mind, the flow proceeds to step S34 where the raw score for that query/target pair is decremented by $factor_{Ni}$. If the user provides no feedback, then the flow proceeds to step S36 where the raw score is decremented by $factor_{Oi}$, which can be zero. After execution of any of steps S32, S34 or S36, the flow proceeds to step S38, at which the experience level score is incremented by $Efactor_{Ci}$.

Figure 5B:
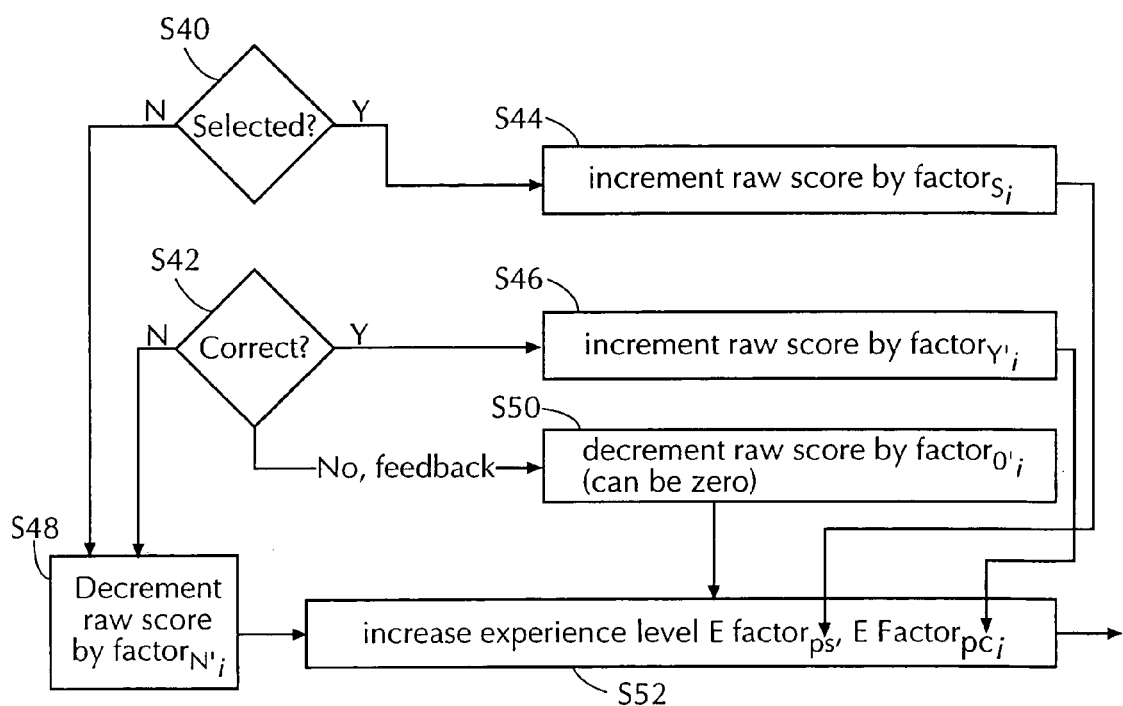

FIG. 5B illustrates a preferred technique for weighting in accordance with user feedback in the case of possibles, i.e., items on the list presented to the user when no probable result can be located. As shown in the figure, if a possible is selected by the user from the presented list, at step S40, the fact of selection is recognized, preferably by use of a redirect server that allows the system to keep track of which link was chosen. Additionally, the amount of time the user spends at the selected link may be ascertained. Making use of the information gathered in the redirect and such other feedback as may be obtained, the raw score for the query/target pair is incremented, at step S44, by $factor_{Si}$. The user is then requested to provide additional feedback after the user has finished viewing the link.

Special conditions apply for initial processing for task/domains for which little or no specific learning experience has yet been gained. Such conditions may persist for infrequently occurring or new task/domains. Here the idea is to build an index table as for the non-task/domain specific case, and use that to the extent useful. This is shown in the task/domain=x section of the table, which includes data that is not identifiable with any task/domain. This will accumulate experience across all task/domains. Lacking a task/domain specificity, the probability factor for a given task/domain based on that data would be lower than experience that is known to relate to that task/domain.

Note that for the procedure illustrated in FIG. 3, this same structure can be used both to infer the task/domain and then to find the result. Given Q(i), the task/domain is inferred by searching for all Q(i), and then getting the corresponding task/domains. Additional information about the user and his history and prior queries from the user/task/domain association data would be used to try to rank the likely task/domains. Such information could indicate that the last 4 queries from the user were in task/domain j, which would raise the likelihood for j and lower it for others, and that that user has never been known to make queries in domains other than j, k, 1, and m, which would raise the likelihood for those task/domains and lower it for others.

As will be expanded upon later, the embodiment of the inventive techniques that has been described and will be further expanded here applies group feedback to the individual's personal search tasks. The same methods can also be used throughout on a single-user basis, using that individual's feedback alone. This can be done by segregating each user's feedback into a more finely structured database, or by retaining and tagging individual feedback elements with user identifiers within the group feedback database (or simply by use in a single-user system). Thus in addition to user/task associations and query/task associations, the database would retain user/query association feedback. Group feedback will be more extensive than individual feedback, and can anticipate the user's needs based on the experience of others in areas for which no individual feedback has yet been obtained, but in some cases individual feedback may be more accurately matched to a user's intent, especially in cases where a user is doing repeated searches or searches similar to those seen previously for that user. Thus an alternate embodiment would apply these techniques based on the individual data alone. A preferred embodiment would apply both in combination, using weighting techniques to obtain a composite preference score that factors in both group and individual feedback. Such weightings could be fixed, adjustable by users, or varied based on various heuristics such as one based on the relative amounts of each kind of feedback, one based on the degree to which a given user is found to be typical or unusual relative to the population, or some combination of such factors.

The above discussion has focused on ways to perform domain segmentation in the Web as it currently exists. However, semantic metadata, such as data types and name-value pairs, is a powerful tool for making explicit the natural domain segmentation of searching tasks. For example, a search for "the Times review of the King book" can exploit the fact, if stated, or the inference, if discernible by examination of semantic metadata, that the Times is intended to be a publication name and that King is intended to be an author. In a database where such semantic metadata is explicit and readily accessible, its availability permits the full power of the feedback learning discussed above applied to a specific task/domain to be tightly focused.

As was discussed above, the use of feedback and heuristics becomes increasingly well-focused and useful when the feedback and learning is segmented into task/domains. However there has been no prior consideration of the added value of feedback in traditional isolated search systems like Lexis/Nexis or Medline which have user populations that are too small to make feedback heuristics very effective. Moreover, feedback driven heuristics are much more effective over the large user populations of the Web. However, the current Web does not generally provide semantic metadata in any consistent or readily accessible form, if at all.

However, that is expected to change. A vision of this change is presented in Tim Berners-Lee's papers on the "Semantic Web" of September 1998, and is reflected in the rapidly expanding work surrounding Extensible Markup Language (XML), Resource Description Framework (RDF), and other related standards for embedding semantic metadata into the Web. These standards will encourage explicit inclusion of semantic metadata in Web content, and provide for efficient access to and manipulation of such data.

As the Semantic Web emerges, it will be practical to utilize the techniques of the present invention as discussed above, to segment user feedback data into task/domains based on semantic types. Searching can then exploit that information in several ways:

Explicit entry of semantic domain information into queries, as in the example above. This is similar to the explicit identification of task/domains discussed above, but has added utility and greater likelihood of user acceptance because it directly exploits stored metadata that may be known to the user to be available to facilitate the search. Use for segmented task/domain specific feedback heuristics is just one of many way to exploit such explicit semantics.

Natural language understanding to infer such information. Again feedback heuristics is a technique that can work with semantic metadata.

Use of feedback heuristics itself at a higher level to rank the domains (or vocabularies) most commonly associated with a specific query. This opens an additional level of utility to the use of such techniques.

In the latter case, the inference of the intended semantic domain is itself a task/domain to which feedback heuristics can be applied. The higher level task/domain is a signifier mapping (or robot command translation), namely to determine the intended semantics (vocabulary) of the query—for example, that Times is a pub-name, review a content-type, and King an author. The second level task/domain is then to find the item(s) that satisfy the query which may be either a signifier mapping task/domain, or a discovery searching task/domain.

These two task/domains are logically distinct but interrelated. In practice they may be best addressed in combination, just as people heuristically use the knowledge that the Times is a popular publication that includes book reviews to understand that meaning of Times is intended in this context. For example, if the semantic type or class of search is not specified, the results of this two level feedback heuristic process could be expressed as:

TABLE 1

| If you meant: | The results are: |
| --- | --- |
| [type 1) | Hit 1a |
|  | Hit 1b |
|  | Hit 1c |
| [type 2] | Hit 2a | where type indicates an inferred task/domain. These would be presented in order of experiential popularity, and the depth in each type also would depend on relative popularity. Naturally, for signifier mapping task/domains, the objective would be to select the one likely intended object whenever that can be identified with high enough confidence.

Related to RDF and the problems of searching is the concept of vocabularies. Different task/domains use different vocabularies. RDF provides a metadata structure for defining such vocabularies and relating them to one another. An aspect of this is the fact that task/domain-specific feedback can be segmented with respect to such vocabularies. In fact, as noted above, feedback heuristics can be applied on two levels, one for determining which vocabulary or semantic element is intended, and one for finding items that match the query specified in terms of that vocabulary or element.

In exploiting natural language, a simple level of understanding could exploit basic cues, such as "the Times review of the King book" as signifying a signifier search task/domain, versus "a Times review of a King book" as signifying a discovery search task/domain. For simple signifier searching, "the IBM site" or "the White House site" could be inferred to intend signifier searches for the corresponding site, as opposed to the inference that the intent is for discovery searches for "IBM" or "the White House" which seek all sufficiently relevant content.

Task/domain segmentation is a powerful way of improving the effectiveness of feedback heuristics. Further, the future of the Semantic Web will provide the required combination of a large community and availability of useful semantic metadata to make such feedback heuristics techniques practical and important.

Considering a finer breakdown of semantic information can further enhance the techniques described so far. Task/domains, as they represent domains of discourse, are broad areas of information or semantic domains, which include a variety of rich information in complex structures of topical categories.

Task/domains in the broadest sense should be understood as the groupings of all related schema or vocabularies, as well as their constituent categories in a given task/domain area, subject area, or semantic domain. A task/domain can correspond to one or more given vocabularies, or XML document type definitions (DTDs), or schema (these terms are more or less used interchangeably). These are referred to herein as generic task/domains. Examples might be publications or real estate.

Topical categories are specific types of information and their instance values, such as the Times as a publication and King as an author, or apartments as a property type and Los Angeles as a location. These may correspond to specific semantic categories within a vocabulary (PropertyTypes in an RDF vocabulary) or specific field type metadata tags in an XML schema.

Further, it is useful to distinguish types of categories or metadata or data fields from values or instances of categories or field types. For example, author or location is a type, King or Los Angeles is a value. In RDF a value would be a Property—the value of a PropertyType for a Resource.

Thus within a generic task/domain we can distinguish at least these four levels:

1. The generic task/domain or vocabulary or schema type;
2. Any of many specific instances of named vocabularies or schemas. For example, there may be many library catalog or purchase order vocabularies, each with similar category/metadata types, and specific instances, each with specifically defined category metadata types and allowed values;
3. The specific category/metadata types or field names; and
4. The specific category/metadata instance values for a given type or field name.

Individual query terms may most commonly refer to elements at level #3 or #4, but can refer to any of these levels. Learning and task/domain segmentation (TDS) can be applied independently at any of the four levels of query terms, categories, and task/domains, or to any or all in combination. In the above discussion, the term task/domain was used loosely to apply to any or all of these levels of semantic structure. The principles of grouping search experience and segmenting learning are common to all. Algorithms such as those described can be used at any of these four levels, with varying degrees of utility, depending on the details of the method and the task/domain at hand.

The explicit declaration of semantics in the Semantic Web will also facilitate the task of defining task/domains, whether for explicit or implicit use in searching. The identification of vocabularies, DTDs and schema is related to the task/domain as outlined above, and the discovery of new defined vocabularies and schema (offline, or during spidering) can be taken as a cue that there may be associated new task/domains. Heuristics can be used to assist in or control the process of defining task/domains, both in terms of user behavior as described above, and in terms of declared (or inferred) object semantics (by categorization, clustering, etc.).

As noted earlier and will be expanded upon later, the embodiment of the inventive techniques primarily here described applies group feedback to the individual's search tasks. The same methods can also be used throughout on a single user basis, using that individual's feedback alone. Thus an alternate embodiment would apply these techniques based on the individual data alone, and a preferred embodiment would apply both in combination.

The core intent of the Semantic Web is to allow clear specification of low-level semantics (level #3 and #4, element types/values) by declaring a named vocabulary and identifying data instances with the element or category type they refer to. Thus they declare that King is an author or Los Angeles is a location. Searching for information in terms of those declared semantics is an intended capability, and one of the prime drivers for declaring semantics. Use of the feedback learning techniques as described herein builds directly on that intent.

At one level higher (level #2, "vocabularies") the knowledge that an item (or "resource") is declared to use a specific vocabulary or DTD or schema is similarly useful in identifying the task/domain that the item belongs to. Thus regardless of the matching of any query terms to specific element metadata (categories/fieldnames/values), the matching to a relevant named vocabulary, DTD, or schema provides a very useful indicator of relevance. This indicator can be used in task/domain learning (with either explicit or implicit recognition of query task/domains). This provides a relatively simple way to exploit any explicit semantic data that may be useful. It can be applied just by giving preferential ranking to any item that has associated semantic data that seems to be relevant, even where such data is sparsely available, and without understanding or applying the details of such data, and thus can be useful long before the Semantic Web is well developed. At the still-higher generic task/domain level (#1, generic task/domains), the same is true.

Further use of explicit semantic information will now be described. This explicit hierarchy of declared semantic data can be exploited by simple techniques of recognizing the stated hierarchy and using it for inferences in support of searching. The task here is to match the stated hierarchy of the declared semantics with a corresponding hierarchy of search terms, and to make appropriate inferences based on the knowledge of both hierarchies. This is done by maintaining this hierarchy specification data and relating it to the index tables (either integrated into them or as associated tables), and similar hierarchy data for query interpretation and processing. For example: if a query is for "the Times review of the King book," the recognition that review may correspond to a named vocabulary which contains authors and books, can be used to give preferred ranking to items that use that vocabulary, and which declare that King is an author and the Times is a publication. An item containing text that lacked these semantic relationships (such as "the troops will be ready for review by the king at all times") would be ranked lower.

If a user enters an explicit task/domain of book reviews (or it has been inferred that that is the task/domain), and it is known that there are several vocabularies commonly used for book reviews, items that use those vocabularies would be preferred, and occurrences of King or Times that are identified as author and publication would also be preferred.

It is evident from these examples that the inherent semantic relationship of categories or metadata types to task/domains, vocabularies, or schema affords opportunities to apply knowledge of these semantic relationships to aid in searching in ways that can be independent of the learning-based techniques explained previously. This direct knowledge of semantic relationships can be added into any process of organizing and ranking index entries to respond to queries. Such knowledge can be obtained directly by analysis of XML schema, DTDs, or other vocabulary specifications. Such specifications may be embedded in XML documents or database elements or separately obtainable. This knowledge can be encoded into search index tables and used in rankings much as feedback data and corresponding probabilities as described for learning-based TDS. In this aspect there is need be no learning, and rather than probabalistic inference, the weightings are done in terms of the semantic correlations derived from the specification of the vocabulary or schema.

Such inferences could be integrated with learning-based inferences to provide enhanced results. In other words, a variety of both learned and specified relationships between search query terms, category types/values, and task/domain types/instances can be used in combination to infer the best responses to a query.

Totally unrelated to the learning techniques, a variety of logic techniques can be used to request or infer the task/domain or vocabulary type that corresponds to a query. This can then be used to refine and rank the results set of a search using any kind of search algorithm.

Conventional query parsing and analysis techniques can be used to extract query terms that may have apparent inferred relationship to specific task/domain or schema or vocabulary instances or to broader types of task/domain or schema or vocabularies (families or classes, such as real estate listings or parts catalogs). Items that are known to be specified in terms of such task/domain semantics would be preferentially ranked.

Natural language and semantic analysis techniques can also be used to enhance such inferences. Explicit requests of task/domain or schema or vocabulary instance can be used to qualify searches and eliminate extraneous results not relevant to that task/domain. This can exploit readily obtainable information that relates target items to specific vocabularies or schemas or DTDs.

Explicit requests of task/domain or schema or vocabulary type can also be used to qualify searches. This can exploit information that relates target items to vocabularies, which in turn can be related to the specified vocabulary types.

Thus, whether using learning techniques or not, the emergence of the semantic Web and similar uses of metadata vocabularies provides a new level of access to richly explicit semantic data that is specifically structured for easy use in automated systems. This data can be used to:

Identify task/domains, and specific defined vocabularies or schema which may be used to limit search results (and to establish additional relationships); and Establish relationships between query terms or categories and other terms or categories that may be helpful in identifying desired search items.

Such data will be readily obtained in the course of Web crawling or spidering techniques such as are already used to build search engine indexes. Network accessible items will generally contain this semantic information directly, or by specific reference in the form a link. What had previously been a difficult task of trying to infer the semantics of an information item will be easy given such explicit semantic data. Use of such semantic data for searches that explicitly reference specific field types and values derives closely from the basic intent of such semantic data, but uses in the indirect ways described here add the kind of richness and subtlety that has not been achievable in attempts to make inferences relating to bodies of information in which the semantics was not explicit. The instance given above, resolving the query for "the Times review of the. King book" based on identification of schema for "reviews" is an example of the kind of leverage that is afforded by drawing on explicit semantics to making simple inference based on this semantic hierarchy.

While the task/domain segmentation of the present invention has been discussed primarily in terms of its applicability to searching the web, the concept has much broader applicability. For example, in the area of robot control, the above techniques can be used to allow a robot to understand more readily the actual intent of a command.

For example, in the n>1 case, analogous to discovery searching, the robot command may be performable in many ways, such as "direct the excess inventory out of the active holding bin," allowing the robot to find any of several allowed places to move the inventory to. The learning techniques discussed above can be utilized, in a task specific manner, to allow the robot to determine an acceptable course of action in response to the command. In the n=1 case, analogous to signifier mapping, feedback heuristics can be utilized in a task-specific manner, to assist the robot in determining the one acceptable action to be taken in response to the command such as "direct the excess inventory to the secondary holding bin." In each case there needs to be a mechanism to obtain feedback, and to pool all feedback from multiple users. If the task is done on the Web this is as described above. If in the real world, this would require ways to get feedback (audible, written, or direct computer entry, etc.) of whether commands were interpreted correctly, and to transmit the results to a central database and learning system that could pool the feedback to update the database. This database (or relevant portions) could then be redistributed back to update the local database to control the local robot device using the request processing logic described. For example, a TV could be adapted to use voice recognition, or entry from a remote control to collect feedback, and could use an Internet link to send in the feedback and get back updated control databases. Given this distribution of task/domains and information flow, the technique works pretty much as described for Web searching/mapping (except that in the case of the TV it would vary with current programming, and preferably be adapted to changing its learning as the schedule changes). Furthermore, a post office zip code scanner could be adapted to receive feedback on routings that would be, for example, entered by local post offices or deliverymen, with computers or handheld devices (like UPS package tracking devices). Similar adaptation could be made to plant floor robots.

It should also be noted, as outlined earlier that multiple distributed search/mapping services can be used to partition the learning process outlined here to more conveniently deal with large numbers of task/domains, or for reasons of scale, business competition, specialization, localized access to specific resource pools or databases, etc. These services could be coordinated for use as a distributed system, or used without any coordination by superimposing an over-arching metasearch service.

To provide additional background on the feedback-learning techniques applied here, as a general matter, the present invention relates to a technique that collects experience (a knowledge base) from a mass population that is open ended or universal, either over all domains, or over some definable subject or interest domain or strata. This represents a significant improvement over prior art learning techniques, which are generally limited in the scope of the population and extent of experience from which they draw their knowledge base.

The technique of the present invention, in a preferred embodiment, uses the Internet to do this in a way that is powerful, economical, and far-reaching. The technique, in the preferred embodiment, uses the Internet to enable collection and maintenance of a far more complete knowledge base than has been used with any prior technique except Collaborative Filtering (CF).

In the present invention feedback learning is advantageously utilized, so that the information is not just collected, but refined based on feedback on the accuracy of prior inferences.

In its broad sense the present invention constitutes a kind of "population cybernetics," in that the learning does not just collect a linear knowledge base, but uses a feedback loop control process to amplify and converge it based on the results of prior inferences, and that it works over an entire population that is open, infinite, and inclusive. This is in contrast to prior learning techniques, which draw on necessarily finite, closed populations.

Some specific techniques applicable to collecting feedback data for use as described above are here described in further detail. In the preferred embodiment, when a link on a list of possibles is selected by the user, rather than connect the user immediately to the chosen link, the finder server first redirects the user to a redirect server where feedback data relating to the selection can be gathered. One item of feedback that may be obtained in this manner is the very fact of the selection. Further feedback can be obtained by additional means, such as monitoring how long the user spends at the selected link, and by directly querying the user.

The redirect linking technique uses the target URL as a server parameter within a composite URL to control the intermediate server parameter within the URL to control the intermediate server. The target URL is embedded as a server parameter within a URL that addresses the redirect server, and the URL parameter is used to control the intermediate server process. Thus a server is called with a first URL, which is a redirect URL that specifies the second URL, i.e., the target URL, as a parameter. For example http://redirector.com/redirector?query12345678/targetserver.com/targetpath1/targetpage1.htm where redirector.com is the intermediate server URL, query12345678 is a unique identifier of the user-query combination, and targetserver.com/targetpath1/targetpage1.htm is the target URL. The network ignores the parameter portion of the URL, which is passed as data to the server.

The server acts on the parameter to perform desired intermediary processing, in this case, the logging of the fact that this link was clicked in response to query12345678, and to redirect the user to the intended location specified by the second URL. The token query12345678 could be a unique identifier corresponding to a logged user-query entry, or it could be the actual query string.

The delay required for the redirect provides the opportunity for additional user feedback to be solicited during the delay, and the connection to the targeted URL can be aborted if the user indicates that the target site is not the one he or she intended. In addition to using the redirect when a link is selected, the technique also preferably is used when an exact match is found, to provide a brief delay before connecting the user to the exact match, to present advertisements and to give the user the time to abort the connection. In any event, the user preferably is given the opportunity to provide feedback after connecting to any site, whether directly as a result of an exact match, or as a result of selecting from a linked possibles list.

The redirect server of the present invention allows data to be gathered on each link as it is followed and redirected. The redirect link can be created in a simple static HTML. However, it is preferable to create the link dynamically for each user selection.

The finder is setup to recognize the feedback function, possibly as a CGI or other gateway/API function, and invoke the appropriate function to parse the URL or other data (referer, cookies, etc.), extract the target URL and feedback information for processing, and return a page containing a redirect (or use framing or other means) to take the user to the desired target.

Further techniques are applicable so that correction after arrival at a wrong site can be made relatively painless by allowing a subsequent request to indicate an error in a way that ties to the prior request and adds information. For example a request, guessfinder.com/lionking, that located the movie but was meant to find the play could be corrected by entering guessfinder.com/lionking/play. A more efficient coding might explicitly indicate an error, such as guessfinder.com/!/lionking/play. Even with the error, this would be quicker and easier than conventional methods. Note that this example was illustrated with the direct URL coding techniques described below. Similar post-arrival corrections can be made with other user interface techniques, such as a frame header that includes appropriate user interface controls to report feedback, much as conventional search engines allow for "refinement" of prior searches.

Correction in-flight can be achieved by using the existing visibility of the redirect page, or enhancing it. When a redirect page is received by a user's browser, it appears for a short time (as specified with an HTML refresh parameter) while the target page is being obtained. In addition to affording a way to optionally present revenue-generating (interstitial) advertising content, that page preferably lists the redirection target, as well as alternatives, allowing the user to see the resolution in time to interrupt it. This is most useful with a browser that permits a redirect to be stopped in mid-stream by clicking the stop button, leaving the redirect page on display, and allowing a correct selection among alternative links to be made. Alternately, a multi-frame (multi-pane) display could be used to allow a control frame to remain visible while the target page is loading in a results frame.

As noted above, the embodiment of the inventive techniques that has been primarily described applies group feedback to the individual's personal search tasks to gain the benefits of the experience of a large population of users. The same methods can also be used throughout on a single user basis, using that individual's feedback alone. Group feedback will be more extensive than individual feedback, and can anticipate the user's needs based on the experience of others in areas for which no individual feedback has yet been obtained, but in some cases individual feedback may be more accurately matched to a user's intent, especially in cases where a user is doing repeated searches or searches similar to those seen previously. Thus alternate embodiments would apply these techniques based on the individual data alone to do learning for that user. A preferred embodiment would apply both levels of feedback in combination, using weighting techniques to obtain a composite preference score that factors in both group and individual feedback. Such weightings could be fixed, adjustable by users, or varied based on various heuristics such as one based on the relative amounts of each kind of feedback, one based on the degree to which a given user is found to be typical or unusual relative to the population, or some combination of such factors. Such a combined technique would apply the same core mechanisms to collect and retain feedback data, and would apply the most detailed and complete level of feedback to the learning process.

A further extension that exploits individual and group feedback is to use collaborative filtering techniques applied to the search behavior data described above to find sets of users who are similar to the current user, and to weight the feedback from those users preferentially. Such CF methods could determine similarity across many task/domains, or within a single task/domain, or a weighted combination of both. This could further exploit the available data by considering and effectively weighting experience outside the immediate task/domain, as well as subsets of experience within the immediate task/domain.

Related refinements could segregate user groups according to any of a variety of measures of authority or expertise in the relevant task/domain. Such measures of authority could be externally derived, or based on inferred relationships (much like the authority rankings in the Google and Clever search systems). Weightings can be applied both to the authority of individual feedback, and to the authority (or imputed value) of target pages. A preferred embodiment of the latter would take the Google/Clever approaches that use the number of links to a page as an authority weighting factor, and preferentially weighting links from other pages determined to be in the relevant task/domain based on searcher feedback. Current systems attempt to segregate authorities into topics, but do not apply user/searcher feedback to that effort.

In addition to the applications listed above, the methods described here for applying population cybernetics with task/domain segmentation may be applied to many other activities, such as those which may fall into the broad category of artificial intelligence. Natural language translation is one such task. Here the discrete decisions of translation are analogous to the robot translation examples above, with the segmented task/domain indexes having correspondence to the alternative dictionaries, grammars, and semantic nets that may be applied in NL translation tasks, but the discrete decisions have a different time pattern, in that a full translation (many decisions) may typically be done at once, and feedback then is gained in batches, first from an original translator/editor, then possibly from others. In this case, the translation of a work would be a task episode, and task/domain selections would relate to that episode (or to a hierarchy of sub-episodes for various sections of the work). Additional feedback data would be stored to maintain details on those relationships. Subsequent translation editors and readers could review the result, and add their own corrections or adjustments, for which similar feedback would be tracked. This could enable the dictionaries to be extended with new translations or variant versions, and for weightings to learn which dictionary versions are most effective for which texts (as well as for various larger groupings of texts into corpi). Here again there can be continual refinement based on collective intelligence, and selective weighting by assigned or inferred levels of authority (including certified translators, uncertified translators, and general readers). These techniques would apply not only to dictionary words and phrases, but also to grammars, semantic nets, alternative algorithms, etc.). Translators and readers could be shown a suggested translation, as well as possible alternatives, as described for searching above, either in a standard display with visible annotations, or based on some simple interaction such as a mouse-over to pop up alternatives, and solicited to indicate if an alternative is preferred. That individual might then see the translation version they specified, and other subsequent viewers might see a newly weighted translation version that reflects the added input. By using such techniques, a collaborative process of continual refinement based on collective intelligence can be applied at various levels up to an open ended set of translations of all content, such as on the entire Internet. Similarly, these techniques can be applied to other NL processing, and to other areas of AI.

The above embodiments of the present invention have been described for purposes of illustrating how the invention may be made and used. The examples are relatively simple illustrations of the general nature of the many possible algorithms for applying task/domain information, semantic metadata, and feedback data that are possible. However, it should be understood that the present invention is not limited to the illustrated embodiments and that other variations and modifications of the invention and its various aspects will become apparent, after having read this disclosure, to those skilled in the art, all such variations and modifications being contemplated as falling within the scope of the invention, which is defined by the appended claims.

What is claimed is:

1. An apparatus for responding to a current user command associated with one of a plurality of task/domains, the apparatus comprising:
   means for storing cumulative feedback data gathered from multiple users during previous operations of the apparatus and segregated in accordance with the plurality of task/domains;
   means for determining a current task/domain with which a current user command inputted by a user is associated;
   means for determining a current response to the current user command based on a portion of the stored cumulative feedback data gathered from the multiple users that is associated with the current task/domain;
   means for communicating to the user the current response; and
   means for receiving from the user current feedback data regarding the current response,
   wherein the current feedback data is added to the portion of the stored cumulative feedback data associated with the current task/domain, and
   wherein the current task/domain determining means determines the current task/domain by inferring the current user task/domain from at least one of past and current user behavior.

2. An apparatus according to claim 1, wherein:
   the apparatus is a server on a wide area network,
   a user command comprises one of a query for a discovery searching task/domain and a signifier for a signifier mapping task/domain.

3. A computer-implemented method for responding to a current user command associated with one of a plurality of task/domains, comprising:
   determining a current task/domain with which a current user command inputted by a user is associated;
   determining a current response to the current user command based on stored cumulative feedback data associated with the current task/domain, wherein the stored cumulative feedback data is gathered from previous iterations of the method and segregated in accordance with the plurality of task/domains;
   communicating to the user the current response;
   receiving from the user current feedback data regarding the current response; and
   storing the current feedback data,
wherein the stored current feedback data is added to the stored cumulative feedback data associated with the current task/domain, and wherein the current task/domain is determined by inferring the current task/domain from at least one of past and current user behavior.

4. A method according to claim 3, wherein:
the method is performed by an apparatus functioning as a server on a wide area network,
a user command comprises one of a query for a discovery searching task/domain and a signifier for a signifier mapping task/domain.

5. A computer-readable storage medium storing program code executable by a program-controlled apparatus, wherein the code is operable to cause the apparatus to:
determine a current task/domain with which a current user command inputted by a user is associated;
determine a current response to the current user command based on stored cumulative feedback data associated with the current task/domain, wherein the stored cumulative feedback data is gathered from previous iterations of the method and segregated in accordance with the plurality of task/domains;
communicate to the user the current response;
receive from the user current feedback data regarding the current response; and
store the current feedback data,
wherein the stored current feedback data is added to the stored cumulative feedback data associated with the current task/domain, and
wherein the current task/domain is determined by inferring the current task/domain from at least one of past and current user behavior.

6. A computer-readable medium according to claim 5, wherein:
the apparatus functions as a server on a wide area network,
a user command comprises one of a query for a discovery searching task/domain and a signifier for a signifier mapping task/domain.

7. An apparatus for responding to a current user command associated with one of a plurality of task/domains, the apparatus comprising:
a digital storage device that stores cumulative feedback data gathered during previous operations of the apparatus and segregated in accordance with the plurality of task/domains;
a first digital logic device that determines a current task/domain with which a current user command inputted by a user is associated;
a second digital logic device that determines a current response to the current user command based on a portion of the stored cumulative feedback data associated with the current task/domain;
a first communication interface that communicates to the user the current response; and
a second communication interface that receives from the user current feedback data regarding the current response,
wherein the current feedback data is added to the portion of the stored cumulative feedback data associated with the current task/domain, and
wherein the first digital logic device determines the current task/domain by inferring the current user task/domain from at least one of past and current user behavior.

8. An apparatus according to claim 7, wherein:
the apparatus is a server on a wide area network,
a user command comprises one of a query for a discovery searching task/domain and a signifier for a signifier mapping task/domain.

9. An apparatus according to claim 1, wherein each of the plurality of task/domains corresponds to a category that the current user command is to be performed in.

10. An apparatus according to claim 1, wherein an objective of the current user command is determined from the current user command, and the determined objective is carried out within the current task/domain determined for the user command.

11. A method according to claim 3, wherein each of the plurality of task/domains corresponds to a category that the current user command is to be performed in.

12. A method according to claim 3, further comprising the steps of:
determining an objective of the current user command from the current user command; and
carrying out the determined objective within the current task/domain determined for the user command.

13. A method according to claim 3, wherein the stored cumulative feedback data is gathered from multiple users.

14. A computer-readable medium according to claim 5, wherein the current of task/domain corresponds to a category that the current user command is to be performed in.

15. A computer-readable medium according to claim 5, wherein the code is operable to cause the apparatus to:
determine an objective of the current user command from the current user command; and
carry out the determined objective within the current task/domain determined for the user command.

16. A computer-readable medium according to claim 5, wherein the stored cumulative feedback data is gathered from multiple users.

17. An apparatus according to claim 7, wherein each of the plurality of task/domains corresponds to a category that the current user command is to be performed in.

18. An apparatus according to claim 7, wherein an objective of the current user command is determined from the current user command, and the determined objective is carried out within the current task/domain determined for the user command.

19. An apparatus according to claim 7, wherein the stored cumulative feedback data is gathered from multiple users.

20. An apparatus according to claim 1, wherein the multiple users include the user that inputted the current user command.

21. An apparatus according to claim 1, wherein the storage means includes a table, and the task/domain segregation is by order of storage in the table.

22. An apparatus according to claim 1, wherein the cumulative feedback data is segregated for identified and unidentified task/domains.

23. An apparatus according to claim 1, wherein the storage means includes a non-tabular data structure.

24. A method according to claim 3, wherein the cumulative feedback data is stored in a table, and the task/domain segregation is by order of storage in the table.

25. A method according to claim 3, wherein the cumulative feedback data is segregated for identified and unidentified task/domains.

26. A method according to claim 3, wherein the cumulative feedback data is stored in a non-tabular data structure.

27. A computer-readable medium according to claim 5, wherein the cumulative feedback data is stored in a table, and the task/domain segregation is by order of storage in the table.

28. A computer-readable medium according to claim 5, wherein the cumulative feedback data is segregated for identified and unidentified task/domains.

29. A computer-readable medium according to claim 5, wherein the cumulative feedback data is stored in a non-tabular data structure.

30. An apparatus according to claim 7, wherein the digital storage device includes a table, and the task/domain segregation is by order of storage in the table.

31. An apparatus according to claim 7, wherein the cumulative feedback data is segregated for identified and unidentified task/domains.

32. An apparatus according to claim 7, wherein the digital storage device includes a non-tabular data structure.

33. An apparatus according to claim 1, wherein the means for storing cumulative feedback data stores cumulative feedback data that is gathered from multiple users and the multiple users include the user that inputted the current user command.

34. A method according to claim 3, wherein the stored cumulative feedback data is gathered from multiple users and the multiple users include the user that inputted the current user command.

35. A computer-readable medium according to claim 5, wherein the stored cumulative feedback data is gathered from multiple users and the multiple users include the user that inputted the current user command.

36. An apparatus according to claim 7, wherein the stored cumulative feedback data is gathered from multiple users and the multiple users include the user that inputted the current user command.

37. An apparatus according to claim 2, wherein the means for storing cumulative feedback data stores cumulative feedback data that is gathered from multiple users and the multiple users include the user that inputted the current user command.

38. A method according to claim 4, wherein the stored cumulative feedback data is gathered from multiple users and the multiple users include the user that inputted the current user command.

39. A computer-readable medium according to claim 6, wherein the stored cumulative feedback data is gathered from multiple users and the multiple users include the user that inputted the current user command.

40. An apparatus according to claim 8, wherein the stored cumulative feedback data is gathered from multiple users and the multiple users include the user that inputted the current user command.

* * * * *